United States Patent
Vander Hoek (10) Patent No.: US 10,065,813 B2
(45) Date of Patent: Sep. 4, 2018

(54) FLAT UNLOADING SYSTEM

(71) Applicant: ANDGAR CORPORATION, Ferndale, WA (US)

(72) Inventor: Dean A. Vander Hoek, Ferndale, WA (US)

(*) Notice: Subject to any disclaimer, the term of this patent is extended or adjusted under 35 U.S.C. 154(b) by 252 days.

(21) Appl. No.: 14/977,043

(22) Filed: Dec. 21, 2015

(65) Prior Publication Data

US 2016/0176661 A1 Jun. 23, 2016

Related U.S. Application Data

(60) Provisional application No. 62/200,548, filed on Aug. 3, 2015, provisional application No. 62/094,828, filed on Dec. 19, 2014.

(51) Int. Cl.
*B65G 65/23* (2006.01)
*B66C 7/02* (2006.01)
*B65G 59/02* (2006.01)

(52) U.S. Cl.
CPC .......... *B65G 65/23* (2013.01); *B65G 59/026* (2013.01); *B66C 7/02* (2013.01)

(58) Field of Classification Search
CPC ...... B65B 69/00; B65G 65/23; B65G 59/023; B65G 59/026; A24C 5/35; A24C 5/352; A24C 5/356; B66C 7/02
See application file for complete search history.

(56) References Cited

U.S. PATENT DOCUMENTS

| | | | |
|---|---|---|---|
| 1,462,468 A | 7/1923 | Schaller | |
| 1,967,719 A | 7/1934 | Morgan | |
| 2,160,581 A | 5/1939 | Behnke | |
| 2,161,836 A * | 6/1939 | Stevenson | 198/607 |
| 2,172,685 A * | 9/1939 | Thompson | B65B 69/00 414/413 |
| 2,226,361 A * | 12/1940 | Taylor | B65G 63/002 212/224 |
| 2,254,550 A * | 9/1941 | Stevenson | B65B 69/00 414/413 |
| 2,397,129 A * | 3/1946 | Davis | B65B 69/00 414/413 |
| 2,612,277 A | 9/1952 | Verrinder | |
| 2,639,827 A | 5/1953 | Otte | |
| 2,667,281 A | 1/1954 | Perkins | |
| 2,704,614 A | 3/1955 | St. John et al. | |
| 2,883,078 A | 4/1959 | Belk et al. | |
| 3,013,680 A | 12/1961 | Paxton | |

(Continued)

FOREIGN PATENT DOCUMENTS

CN 2829978 Y 10/2006
CN 202944375 U 5/2013

*Primary Examiner* — Glenn F Myers
(74) *Attorney, Agent, or Firm* — Robert L. Shaver; Scott D. Swanson; Shaver & Swanson, LLP (57) ABSTRACT

A produce loading and unloading device and system. The device and system has structures for lifting an entire stack of flats loaded with produce such as berries, moving the stack of flats to a conveyor, and dumping the produce off each flat of the stack, one flat at a time. During the process, the operator of the device doesn't have to lift a single flat of produce. The dumping operation operates continuously, with no pauses to load stacks of flats. Throughput and safety are greatly improved.

13 Claims, 6 Drawing Sheets

(56) References Cited

U.S. PATENT DOCUMENTS

| | | | | |
|---|---|---|---|---|
| 3,066,968 A | * | 12/1962 | Brooks | B66C 1/24 |
| | | | | 294/63.1 |
| 3,096,891 A | | 7/1963 | Verrinder et al. | |
| 3,107,800 A | | 10/1963 | Gerrans | |
| 3,113,683 A | * | 12/1963 | Von Gal, Jr. | B65B 69/00 |
| | | | | 414/416.01 |
| 3,223,097 A | | 12/1965 | Spaulding | |
| 3,244,304 A | | 4/1966 | Pollak, Jr. et al. | |
| 4,417,839 A | | 11/1983 | Whitehead, Jr. et al. | |
| 2013/0092187 A1 | * | 4/2013 | Lim | B08B 3/00 |
| | | | | 134/8 |

* cited by examiner

FIG. 6

FLAT UNLOADING SYSTEM

PRIORITY/CROSS-REFERENCE TO RELATED APPLICATIONS

This application claims the benefit of U.S. Provisional Application No. 62/094,828, filed Dec. 19, 2014, and U.S. Provisional Application No. 62/200,548, filed Aug. 3, 2015, the disclosures of which are incorporated by reference.

TECHNICAL FIELD

The presently disclosed technology relates to a produce unloading system, and more specifically to system that moves and dumps flats loaded with produce.

BACKGROUND

Many types of produce are soft and somewhat fragile. These include cucumbers and berries of many types, such as raspberries, blueberries, blackberries, and strawberries as examples. For this reason they are harvested by hand, and placed in a shallow container called a flat, tray, lug, or tote. A problem with this type of produce is that each flat must be handled many times, and it is often lifted by a worker, who then turns and sets it on a belt or conveyer. Bending over to lift the flat, lifting the flat, then turning while holding the flat, then bending over to set it down leads to excessive strain on the back. The flat may have to be lifted other times in the process, leading to more work and injuries. Workers in these jobs often have injuries related to the lifting, turning and bending that is required. This job is one of the least desirable jobs in the production line, and to prevent injuries a worker doesn't work a full shift at a lifting job. Decreased injuries and reduced labor costs, as well as faster throughput of product, are desirable.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

Disclosed is a device for unloading produce such as berries from flats. Flats are defined as meaning any of the open topped containers described above, and are generally rectangular containers with short side walls and a floor in the bottom for holding produce such as raspberries, blueberries, strawberries or other fragile fruits or vegetables. The machine also works with lugs, which are simply flats with higher walls. The term "flat" shall be understood to mean either a flat, tray, box, carton, tote, lug, or other open top container that can carry produce.

The flats are stacked together to form a stack, which generally will be moved in groups of four stacks on a pallet. Each stack holds approximately 20 flats (or 6 lugs). Using present technology, each flat is taken off the stack one at a time manually by a worker, turned upside down to remove the fruit from the flat, and then the flat is sent to a washer to be cleaned and reused. This process is very stressful to a person's back, and injuries are frequent, and the job is rotated frequently.

In the disclosed technology, the stack of flats is moved as a unit from where they enter the processing area, to a feed position. This is accomplished by means of a loading crane, a load frame, and an infeed conveyor. The load frame (also called a cradle) cradles, and engages the entire stack of flats using sets of forks. These sets of forks (one or more sets) are arranged to simultaneously engage the lips on the left and right sides of flats. The engagement constrains them both to move vertically with the frame and also from tipping off the frame by translating horizontally. After engaging the stack of flats with the load frame, the operator lifts the entire stack by activating the hoist and guiding the stack using the gripping handles on the load frame. The operator is then able to move the stack to the infeed conveyor by means of the pivot arm and sliding pulley block for hoist. The entire stack is unloaded onto the infeed conveyor from which it will move into the stack lifter. Multiple stacks of flats can be set onto the infeed conveyor to await being loaded into the stack lifter.

The bottom position in the stack lifter is called the chamber. One at a time, each stack of flats is moved on the conveyor into the chamber of the stack lifter. Moving the stack of flats into the chamber can be manual, such as my pushing on a roller belt, or automated such as using a conveyor belt or pusher of some kind. In the chamber, the entire stack is lifted by lifting tabs which support the bottom edges or side edges of the lowest flat in the stack. The lifting tabs are attached to a pair of counter rotating lifting belts or chains on both sides of the stack, which lift the flats one flat at a time to launching point, then the belts move back down in a circular rotation on each side of the stack of flats, to engage another stack of flats. There are two tab locations on a given belt so that the next stack can be lifted before the first stack has finished being dumped, providing a continuous flow of flats to the dumping arms at the launch point.

From the launch point, the top flat is lifted off the stack by a pair of dumper arms. The dumper arms include grippers which engage the flats by means of spring loaded clips or by air actuated grippers. After the top flat is gripped, the dumper arms lift and rotate the flat about 120 degrees off of the stack and dump the product out of the flat. The flat impacts a structure and comes to rest over a pair of ejector arms. This impact helps to remove stubborn produce out of the flat. Next, the ejector arms lift and rotate the flat to a discharge conveyor while the dumper arms return to position to grip the next flat from the stack, which has simultaneously indexed up such that the next top flat is in the launch position. Meanwhile, the ejector arms return to their home position in time to be under the next dumping flat. In this manner, the machine continues to cycle through all of the flats in the stack at a consistent rate.

Furthermore, the stack of flats may be weighed electronically by a load cell while waiting to be loaded into the chamber. This information can be used by the PLC to provide a consistent mass flow instead of a consistent container flow by slightly altering time between dumps to adjust for stack weight.

It is significant that the machine is able to unload entire stacks of flats without operator interaction because it provides a reduction in labor requirements, increased worker safety and a consistency of flow, and a greatly increased throughput. In previous technology, it has been required that the operator unload flats one at a time into a separate dumping mechanism or to be hand dumped.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE PREFERRED EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 1:
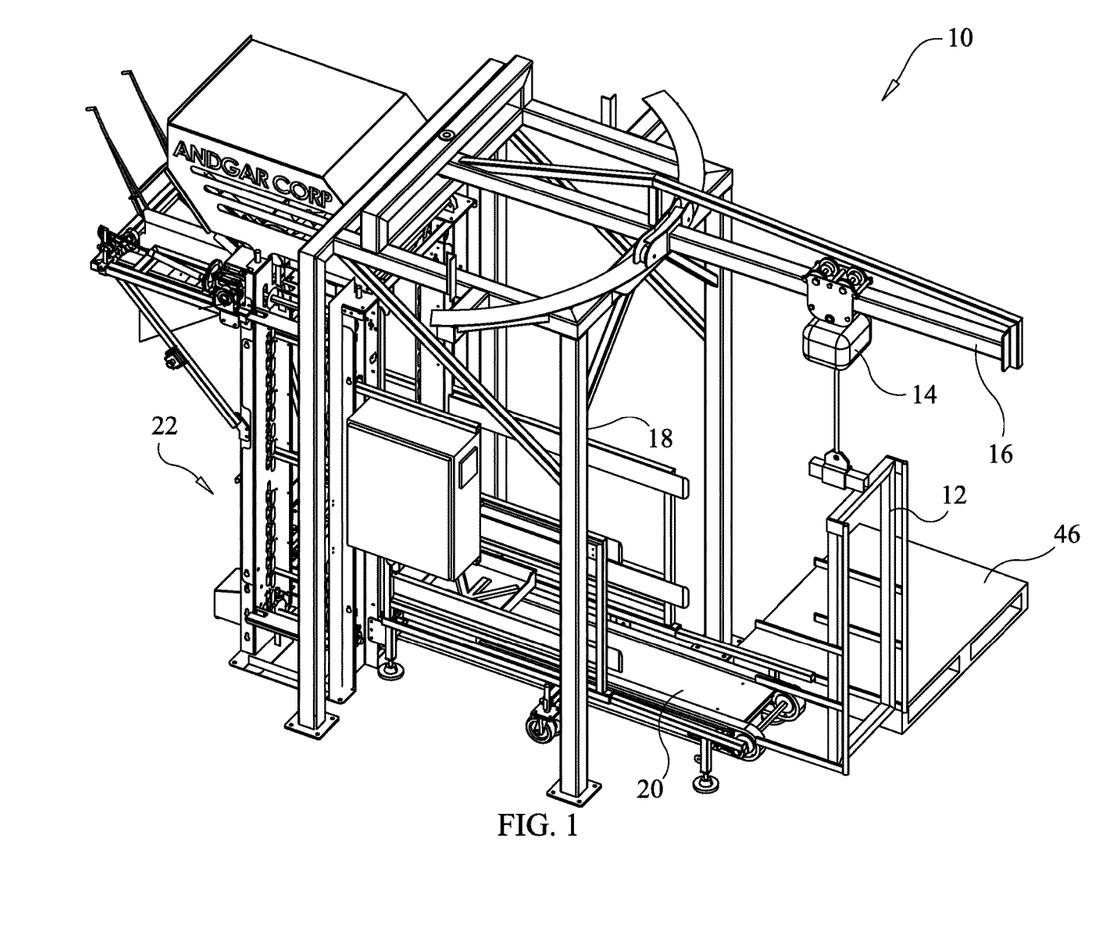
FIG. 1 is a perspective view of the disclosed flat unloading system.

Shown in FIG. 1 is a view of the disclosed flat unloading system 10. The processing machine of the disclosed technology is designated 10, also called a flat unloading system, is made up of several subunits, which each performing an essential task. The subunits include the stack moving assembly 11, made up cradle 12, the stack lifting assembly 14, the crane track 16 and the load frame 18. The function of these last four elements is to engage a stack of flats, lift the stack of flats without the operator having to lift any weight, and moving the stack of flats onto the end of infeed conveyor 20. More about this system and its parts is more clearly shown in FIG. 2. Another subcomponent of the flat unloading system 10 which is shown in FIG. 1 is the stack lifter 22. The stack lifter 22 is shown more clearly in FIG. 3. The stack lifter 22 includes a stack lifting frame 24 with a lifting belt 26 on each side of the lifting frame. The lifting belt has tabs on the belts on either side of the lifting frame, with the tabs structured to engage the bottom flat of a stack of flats.

Figure 2:
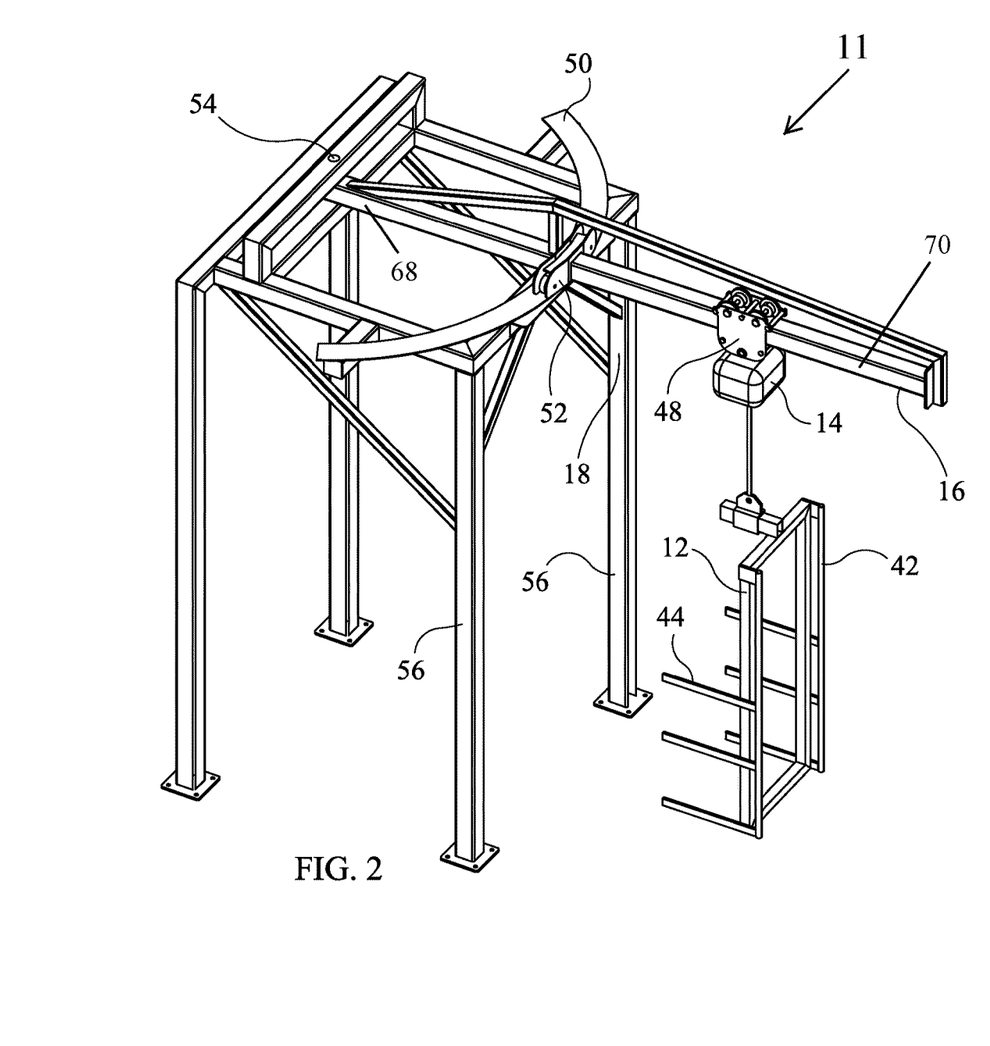
FIG. 2 is a perspective view of the stack lifting crane portion of the flat unloading system.

FIG. 2 shows the stack engaging frame called a cradle 12, which has cradle handles 42, and at least one pair of attached cradle forks 44. The configuration of the cradle, cradle handles, and cradle forks depends on the size of the flats or totes used, but for typical flats which are 24"×16" with 1.5" or 3" high sidewalls, the cradle would be approximately 66" tall, it would have 3 pairs of forks, each fork being 15" long. The forks 44 are shaped to engage a lip on the side of flats 30 in the stack of flats 32. The stacks of flats are typically moved on a pallet 46 with 4 stacks of flats per pallet and with 20 flats per stack. The cradle 12 can be easily moved left or right, in or out, by a roller 48 which slides on rollers 48 on an overhead crane track 16, providing movement from a first end 68 of the crane track to a second end 70 of the crane track 16. The crane track 16 moves side to side on a curved lateral track 50, by use of a second roller 52. The crane track 16 pivots at a pivot point 54 attached to the load frame 18. The load frame 18 includes the support legs 56, the crane track 16, the lateral track 50, the hoist 14, and the roller 48. The support legs in a typical installation are made of square steel tubing 4"×4", and would be about 120" tall. The crane track 16 in a typical configuration would be 96" long.

After a stack of flats is engaged by the attached cradle forks 44, a hoist 14 lifts the entire stack of flats, and the stack of flats is moved over the infeed conveyor 20, and the stack of flats is lowered by the hoist 14 onto the infeed conveyor 20.

Figure 3:
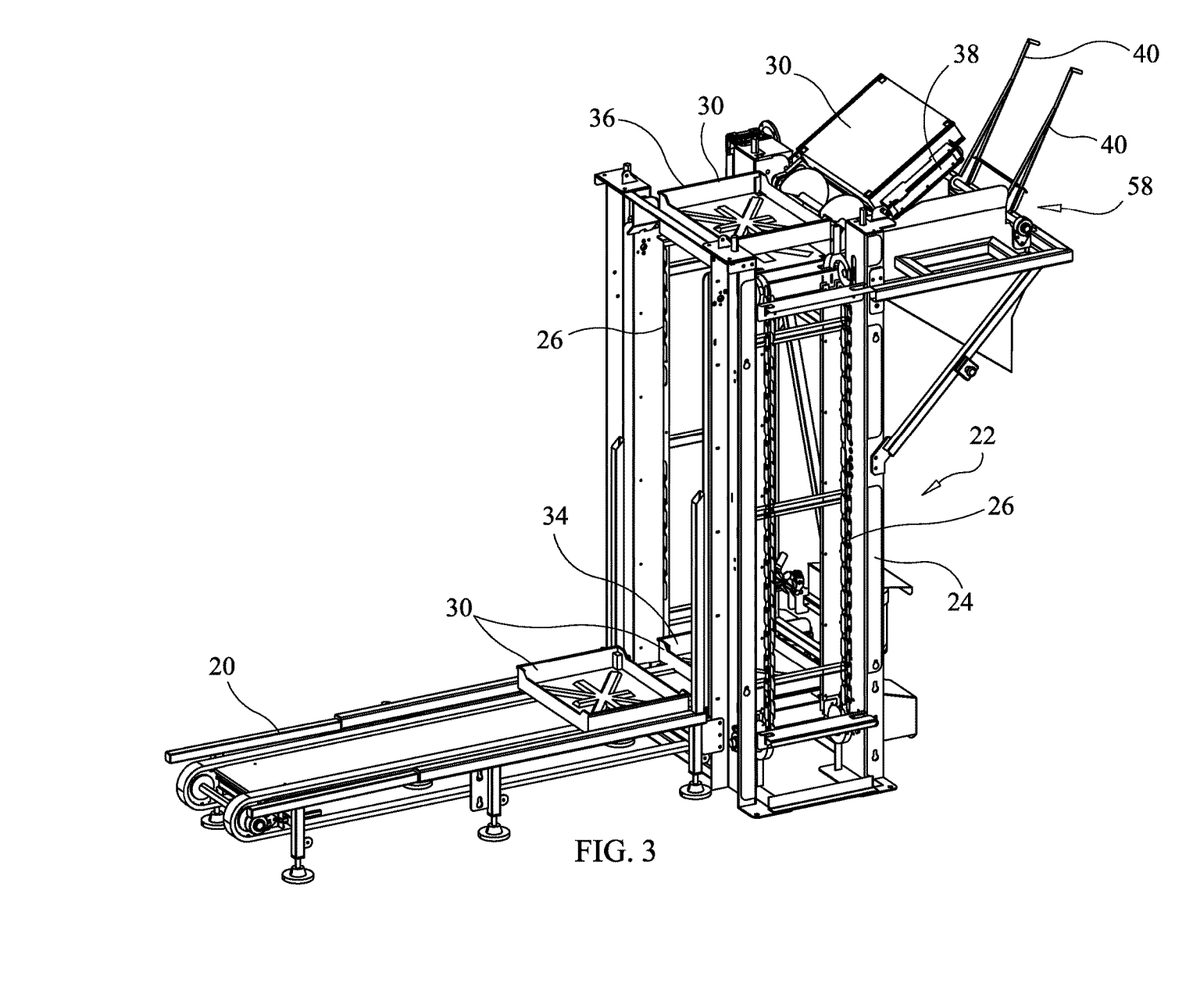
FIG. 3 is a perspective view of the stack lifter portion of the disclosed flat unloading system.

Shown in FIG. 3 is the stack lifter 22 portion of the device, the flat flipper assembly 58 portion of the device, and the infeed conveyor 20. Shown in various stages of processing are four flats 30, but it is understood that the entire area inside the stack lifter would typically contain a stack of flats or a partial stack. Shown in FIG. 3 is the infeed conveyor 20. The normal state of the device would have one or more stacks of flats 32 on the infeed conveyor 20, and a full stack or a partial stack off flats in the flat lifter 22.

The stack lifter 22 has a stack lifting frame 24, and is positioned adjacent to the infeed conveyor 20. The infeed conveyor can be powered, such by a motor, or passive, such as with rollers. A stack of flats is moved into the open space in the loading position or loading chamber 34 of the stack lifter 22, and the stack is lifted by flat support tabs 28 on lifting belts 26 on either side of the stack lifter lifting frame 24. In one configuration, the lifting belts are formed of two chains on each side of the stack lifter frame, and each lifting belt has two flat support tabs 28 which support the base of the bottom flat. Each of the lifting belts rotate opposite of each other, so the right belt rotates clockwise, and the left lifting belt rotates counterclockwise. The flat support tab 28 of each support the base of the bottom flat, and lift that flat and those above it toward the launch position 36. More than two pairs of tabs are possible on the lifting belts 26. The stack of flats is thus lifted in increments of one flat height at a time, and is coordinated so that as a flat 30 is lifted off the launch position, the entire stack of flats in the stack lifter is moved up the height of one flat. In this way there is always one flat in the launch position when the dumper arms 38 swing back to engage a new flat.

Dimensions of each part of the machine would vary depending on the size of the flats used. As noted above, a flat which has higher sidewalls is called a tote, and the flats would typically be 16 inches wide and 24 inches long, with sidewalls 1.5 or 3 inches high. A tote would typically be 16 inches wide and 24 inches long, with sidewalls 7 inches high. The position at the bottom of the stack lifter is called the chamber 34 and the position of the flat at the top of the stack lifter is said to be in the launch position 36.

A stack of flats is inserted into the stack lifter 22 as soon as there is room available from the previous stack being sufficiently lifted and dumped. The stack 32 slides into the chamber 34 and entire stack is lifted in the stack lifter 22.

Figure 4:
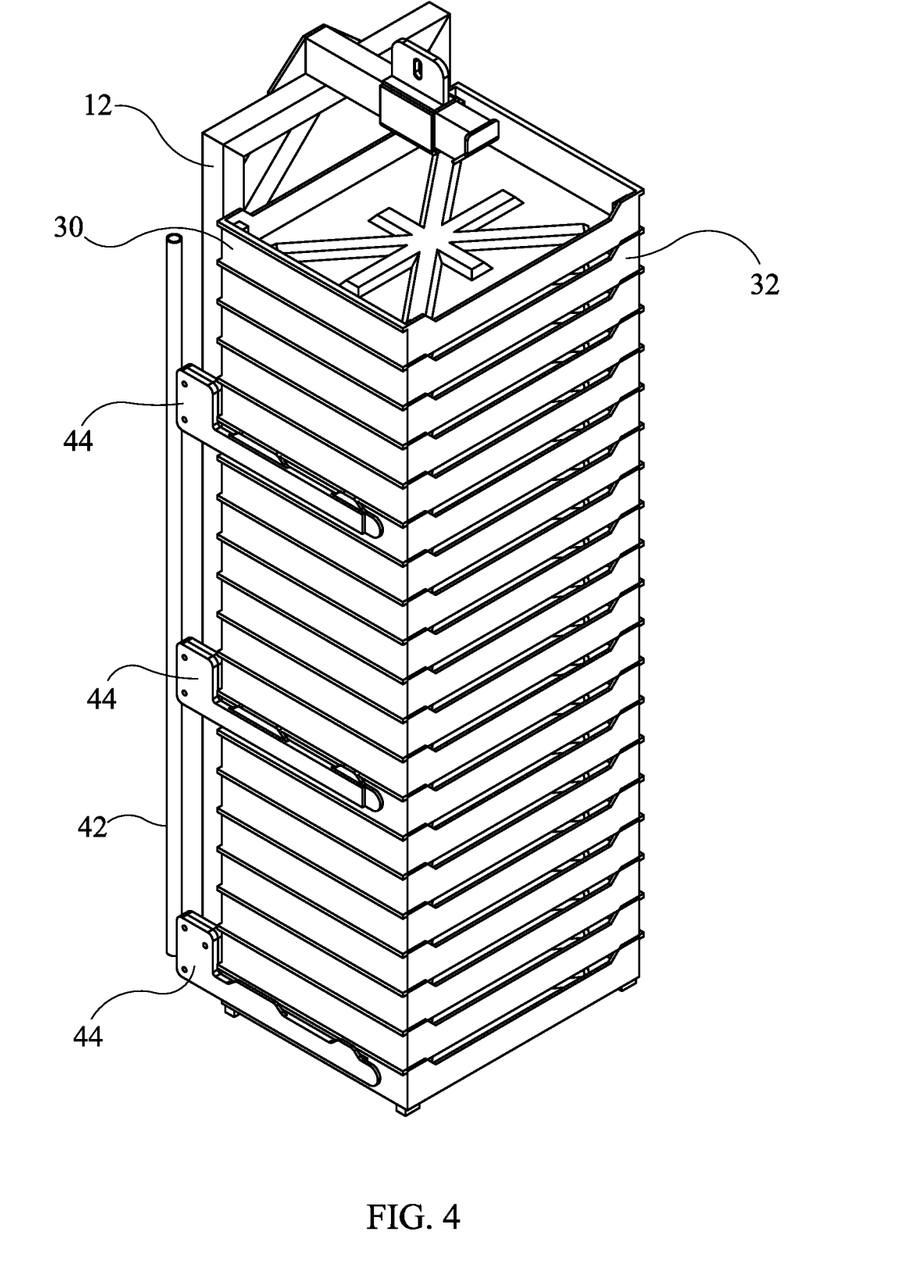
FIG. 4 is a perspective view of the cradle and a stack of flats of the disclosed flat unloading system.

FIG. 4 shows a stack of flats 32, the cradle 12, cradle handle 42, and attached cradle forks 44. The cradle forks 44 are structured to be inserted in a generally horizontal angle of attack in to the flats, to engage one flat, and to lift the flats in a generally horizontal direction.

Figure 5:
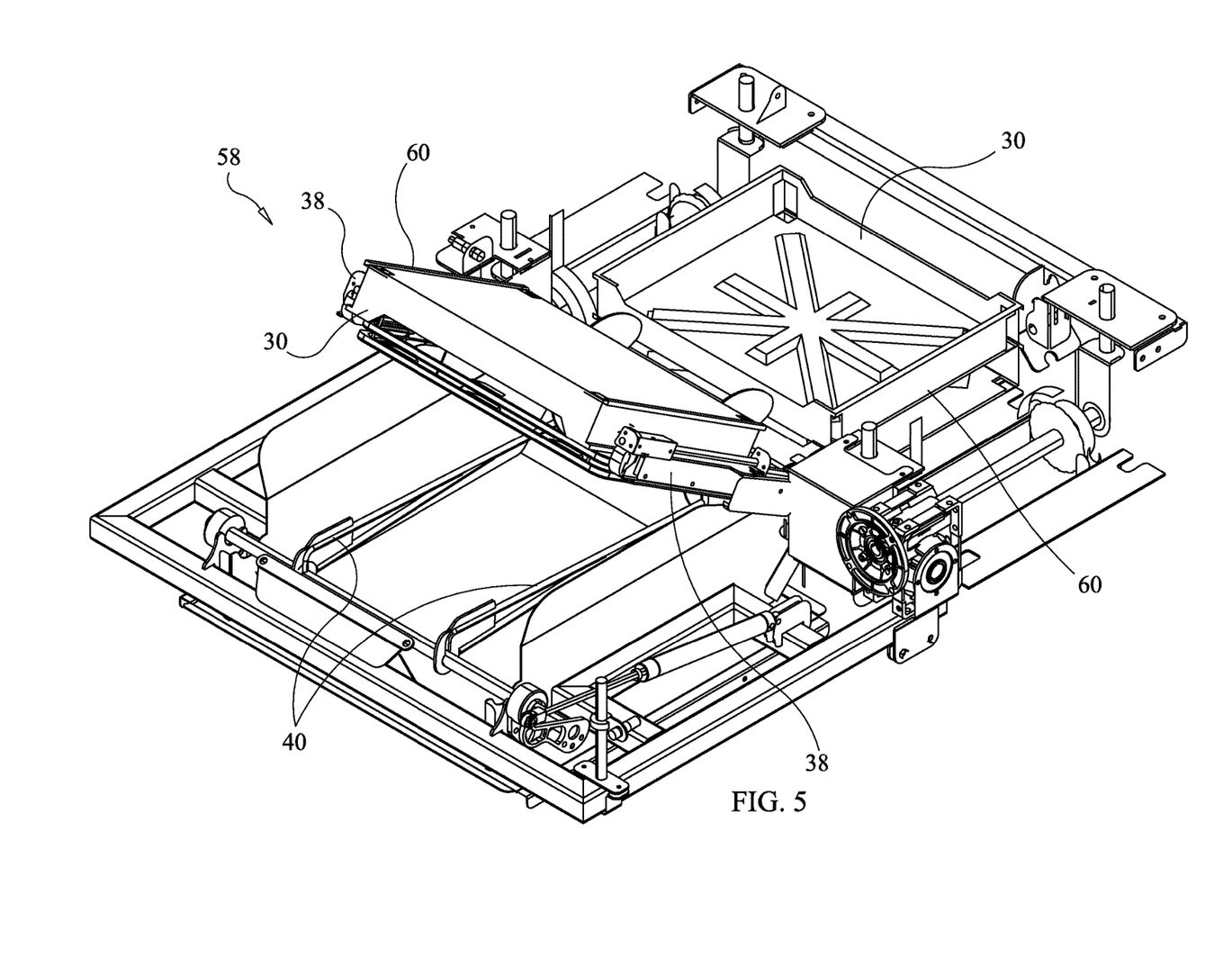
FIG. 5 is a perspective view of the flat flipping portion of the disclosed flat unloading system

FIG. 5 shows the flat flipper assembly 58 portion of the device. Flats 30 are lifted off of the launch position 36 one flat at a time by a pair of dumper arms 38. The dumper arms rotate toward the flat to grasp the lip 60 on the side of the flat 30 which is in the launch position 36, and then the dumper arms rotate approximately 120 to 180 degrees in the opposite direction and lift the flat 30 to an inverted position, and drop the inverted flat a preselected distance onto a pair of ejector arms 40. The point at which the inverted flat drops away from the dumper arms is called the release point. The ejector arms 40 then flip the flat 30 again in a direction away from the flat flipper assembly 58 and deposit it in another location, such as a removal belt (not shown). While the dumper arms 38 engage a flat in the launch position 36, the ejector arms move into a position to be under the flat 30 as it is flipped and dropped by the dumper arms. As the ejector arms flip the flat away from the flat flipper assembly unit 58, the dumper arms rotate back toward the stack lifter 22, and engage the flat 30 which has been raised into the launch position 36. After engagement by the dumper arms 38, the flat 30 is rotated and dropped onto a pair of ejector arms 40, which are positioned where the flat will fall from the dumper arms. The lip 60 of the flat 30 can be engaged by a spring loaded catch on the dumper arms, which pass over the flat lip 60 in the downward movement of the dumper arm, and which engage the flat lip 60 when the dumper arm moved upward. Other structures for engaging the flat lip are possible, which as by pneumatic, hydraulic, or electric activation.

Figure 6:
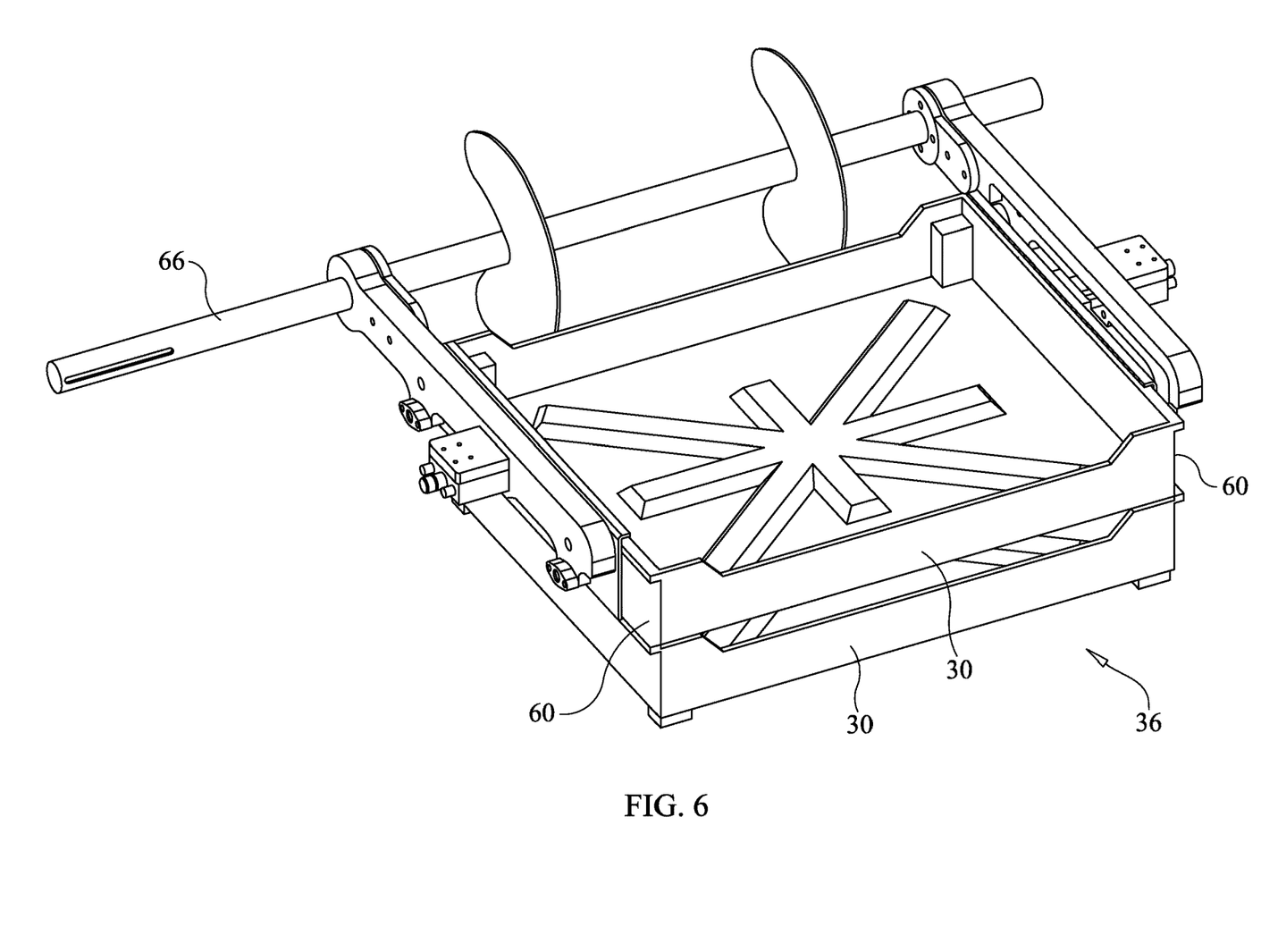
FIG. 6 is a perspective view of the dumper arms and a flat to be dumped.

FIG. 6 shows two flats 30, with one of them in the launch position 36. Each flat has a lip 60 on each side. The lip 60 is shown engaged by the dumper arms 38. When activated, the dumper arms 38 and flat 30 full of produce rotate around the dumper axle 66, and drop the flat onto the waiting ejector arms shown in FIG. 5.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A processing machine for removing produce from flats, comprising:
   a stack moving assembly for moving a stack of flats into a stack lifting assembly, said stack lifting assembly for raising said stack of flats in increments of one flat to position a top flat in a launch position at the top of said stack, for engagement with a flat flipper assembly;
   said flat flipper assembly comprising a pair of dumper arms configured to engage said top flat of said stack of flats in said launch position, and to rotate said top flat off the top of said stack of flats in an approximately 180 degree rotation, to invert said top flat and thus cause release of said produce from said top flat, with said dumper arms configured to return to said launch position after inverting and releasing said top flat, for pickup of another said top flat in said launch position;
   said flat flipper assembly further comprising a pair of ejector arms configured to be positioned under said top flat when said top flat is inverted, and to rotate to lift said top flat off of said flat flipper assembly; wherein rotation of said dumper arms and ejector arms are coordinated so that when said dumper arms engage said top flat in the launch position, said ejector arms are engaged in removing an inverted top flat from said flat flipper assembly, and moving into a position under a release point of said inverted top flat from said dumper arms, and when said dumper arms invert and release said top flat, said ejector arms engage said top flat and begin to rotate to lift said top flat in a direction away from said flat flipper assembly.

2. The processing machine of claim 1 in which said dumper arms are configured to release said top flat above said ejector arms, so that said inverted flat falls a preselected distance and strikes said ejector arms.

3. The processing machine of claim 1 in which said stack moving assembly further comprises a stack engaging frame attached to a hoist, with said hoist mounted on a pivotally rotational overhead crane track, with said hoist attached to rollers allowing movement from one end of said crane track to another, and with said crane track pivotally attached at one end to a pivot point, for side to side movement of said crane track and an attached stack of flats, said hoist and said crane track for engaging and lifting said stack of flats, and for moving said stack of flats side to side or in and out and for depositing said stack of flats on an infeed conveyor.

4. The stack engaging frame of claim 3 in which said stack engaging frame comprises at least one pair of attached cradle forks, with said cradle forks configured to engage a feature on said flat and lift said flat and additional flats sitting on top of said flat.

5. The processing machine of claim 4 in which said at least one pair of cradle forks of said cradle frame are configured to be inserted on either side of said flat in a generally horizontal angle of attack, for engaging of said flat and lifting in a vertical direction.

6. The processing machine of claim 3 in which said stack lifting assembly further comprises
   a lifting frame in which said stack of flats is placed in said lifting frame and lifted in increments of one flat so that the top flat may be removed from the stack of flats by said flat flipper assembly, with said stack lifting assembly configured to receive a stack of flats from said infeed conveyor, with said stack lifting assembly configured to receive a stack of flats in a position under a previous stack of flats before the last flat of said previous stack of flats has been engaged and removed, so that flats can continually be engaged, flipped and unloaded without stopping said stack lifting assembly to insert another stack of flats.

7. The processing machine of claim 6 in which said lifting frame further comprises a pair of counter rotating lifting belts attached to said frame on either side of said stack of flats, with at least one flat support tab on each lifting belt, with said support tabs configured to support bottom flats from each side, with the counter rotating lifting belts for lifting said stack of flats.

8. The processing machine of claim 3 in which infeed conveyor further comprises a powered belt to feed stacks of flats laden with produce into a loading position in said stack lifting assembly, with said stack engaging frame configured to place a stack of flats laden with produce onto said infeed conveyor.

9. The processing machine of claim 1 in which said dumper arms rotate approximately 120 degrees after engaging said top flat in a launch position, at which point said top flat is inverted and dropped from said dumper arms.

10. The processing machine of claim 1 in which said ejector arms rotate approximately 110 degrees to engage and move inverted trays out of said flat flipping assembly.

11. A processing machine for removing produce from flats, comprising:
- a flat flipper assembly comprising a pair of dumper arms configured to engage a top flat in a launch position, and to rotate said top flat off the top of said stack of flats in an approximately 180 degree rotation, to invert said top flat and thus cause release of said produce from said top flat, with said dumper arms configured to return to said launch position after inverting and releasing said top flat, for pickup of another flat in said launch position;
- said flat flipper assembly further comprising a pair of ejector arms configured to be positioned under said top flat when said flat is inverted, and to rotate to lift said top flat off of said flat flipper assembly; wherein
- rotation of said dumper arms and ejector arms are coordinated so that when said dumper arms engage said top flat in the launch position, said ejector arms are engaged in removing an inverted top flat from said flat flipper assembly, and moving into a position under a release point of said top flat from said dumper arms, and when said dumper arms invert and release said top flat, said ejector arms engage said top flat and begin to rotate to lift said top flat in a direction away from said flat flipper assembly.

12. The processing machine of claim 11 in which said dumper arms rotate approximately 120 degrees after engaging said top flat in said launch position, at which point said top flat is inverted and dropped from said dumper arms.

13. The processing machine of claim 11 in which said ejector arms rotate approximately 110 degrees to engage and move inverted trays out of said flat flipping assembly.

* * * * *